(12) United States Patent
Thomas et al.

(10) Patent No.: US 7,656,842 B2
(45) Date of Patent: Feb. 2, 2010

(54) METHOD AND APPARATUS FOR MIMO TRANSMISSION OPTIMIZED FOR SUCCESSIVE CANCELLATION RECEIVERS

(75) Inventors: Timothy A. Thomas, Palatine, IL (US); Kevin L. Baum, Rolling Meadows, IL (US); Frederick W. Vook, Schaumburg, IL (US); Xiangyang Zhuang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 634 days.

(21) Appl. No.: 11/209,308

(22) Filed: Aug. 23, 2005

(65) Prior Publication Data

US 2006/0067277 A1 Mar. 30, 2006

Related U.S. Application Data

(60) Provisional application No. 60/614,910, filed on Sep. 30, 2004.

(51) Int. Cl.
*H04W 4/00* (2009.01)
(52) U.S. Cl. ............. 370/334; 370/335; 370/310; 370/437; 370/333; 375/275
(58) Field of Classification Search .......... 370/334, 370/310, 437, 335, 333; 375/275, 267
See application file for complete search history.

(56) References Cited

U.S. PATENT DOCUMENTS

| | | | |
|---|---|---|---|
| 7,248,638 B1 * | 7/2007 | Banister | 375/267 |
| 2002/0051433 A1 * | 5/2002 | Affes et al. | 370/335 |
| 2003/0112889 A1 * | 6/2003 | Thomas et al. | 375/295 |
| 2003/0157954 A1 * | 8/2003 | Medvedev et al. | 455/522 |
| 2003/0185309 A1 * | 10/2003 | Pautler et al. | 375/257 |
| 2005/0037718 A1 * | 2/2005 | Kim et al. | 455/101 |

OTHER PUBLICATIONS

Timothy A. Thomas et al., "A Method for Improving the Performance of Successive Cancellation in Mobile Spread MIMO OFDM," Motorola Labs—Communication Systems Research Laboratory, Schaumburg, IL, 4 pages.

(Continued)

*Primary Examiner*—Dwayne Bost
*Assistant Examiner*—Pierre-Louis Desir

(57) ABSTRACT

A method for communicating a plurality of data streams between a transmitting device with multiple transmit antennas and a receiving device, is disclosed. The method comprises determining a list consisting of a subset of the multiple transmit antennas on which the transmitting device will transmit data, determining a set of power weightings, providing the set of power weightings and the list of the subset of the multiple transmit antennas to the transmitting device, weighting a plurality of data streams by the power weightings, and transmitting the power weighted data streams on the subset of the multiple transmit antennas to the receiving device. Another aspect of the invention comprises maintaining a codebook consisting of a plurality of transmit weight vectors at both the transmitting device and the receiving device. The method also comprises determining a list consisting of a subset of the plurality of transmit weight vectors which to use for transmitting the multiple data streams, determining a set of power weightings to be use for each data stream, providing the set of power weightings and the list of the subset of the plurality of transmit weight vectors to the transmitting device, and weighting the data streams by the power weightings and beamforming the data streams with the subset of the plurality of transmit weight vectors.

16 Claims, 12 Drawing Sheets

OTHER PUBLICATIONS

David J. Love, et al., "Grassmannian Beamforming for Multiple-Input Multiple-Output Wireless Systems," IEEE Transactions on Information Theory, vol. 49, No. 10, Oct. 2003, pp. 2735-2747.

Frederick W. Vook et al., "Signaling Methodologies to Support Closed-Loop Transmit Processing in TDD OFDMA," IEEE C802, 16e-04/103r2, pp. 1-34.

* cited by examiner

100

200

300

400

500

600

700

800

900

1000

1100

1200

METHOD AND APPARATUS FOR MIMO TRANSMISSION OPTIMIZED FOR SUCCESSIVE CANCELLATION RECEIVERS

FIELD OF THE INVENTION

The present invention relates generally to communication systems, and in particular, to a method and apparatus for Multiple Input Multiple Output (MIMO) transmission.

BACKGROUND OF THE INVENTION

Multiple Input Multiple Output (MIMO) is a transmission method involving multiple transmit antennas and multiple receive antennas which promises to greatly increase the link capacity of wireless communication systems. Various transmission strategies require the transmit array to have some level of knowledge concerning the channel response between each transmit antenna element and each receive antenna element, and are often referred to as "closed-loop" MIMO. Obtaining full broadband channel knowledge at the transmitter is possible using techniques such as uplink sounding in Time Division Duplexing (TDD) systems and channel feedback in either TDD or Frequency Division Duplexing (FDD) systems. Limited feedback methods like feeding back message for antenna selection or codebook-based beamforming weights selection can reduce the amount of feedback needed for full channel feedback. However these limited feedback methods are not optimized for receivers that implement successive cancellation, which is a popular prior-art receiver technique that can provide significant gains over linear combining techniques (such as MMSE) with a moderate complexity increase. Thus there is a need for optimizing these limited feedback transmission methods for receivers that will implement successive cancellation.

SUMMARY OF THE INVENTION

Figure 1:
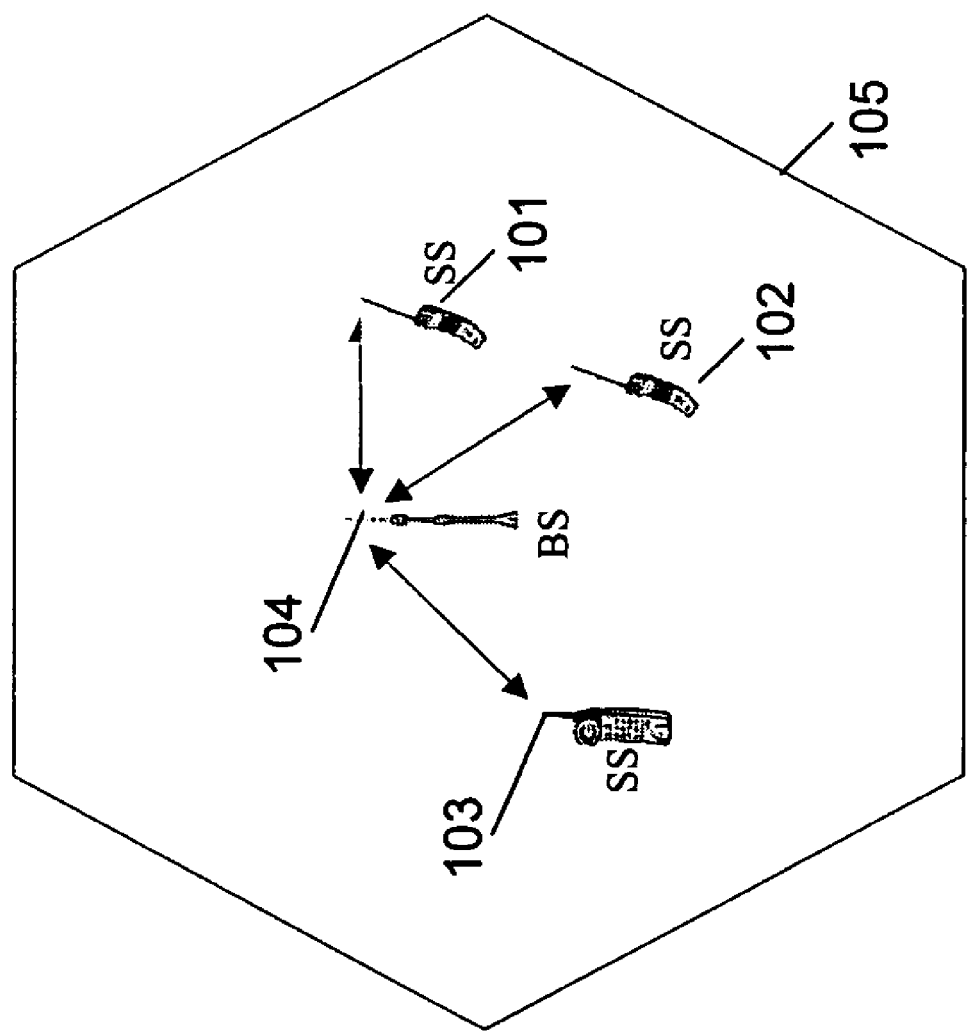
FIG. 1 is a block diagram of a communication system.

Closed-loop Multiple-Input Multiple-Output (MIMO) methods promise to greatly improve the performance of MIMO communications if full channel knowledge is known at the transmitter. Obtaining full broadband channel knowledge at the transmitter is possible using techniques such as uplink sounding in Time Division Duplexing (TDD) systems and channel feedback in TDD or Frequency Division Duplexing (FDD) systems. Limited feedback methods like feeding back message for antenna selection or codebook-based beamforming weights selection can reduce the amount of feedback needed for full channel feedback. However these limited feedback methods are not optimized for successive cancellation reception. Methods for improving successive cancellation for open-loop MIMO are known in the art for broadband frequency-selective channels and for frequency-flat channels. However these existing methods do not encompass how to choose codebook beamforming weights and also are not applicable when the number of transmit antennas is greater than the number of MIMO streams.

The invention is a method and device for MIMO transmission using limited feedback in broadband communication systems such as OFDM, spread-OFDM, and cyclic-prefix single carrier. The feedback is designed to improve the performance of successive cancellation when codebook selection over a band of frequencies or set of subcarriers is used. A codebook weight (e.g., antenna selection or Grassmannian weights for example) is determined over a group of frequency-domain subcarriers for each MIMO data stream along with a power weighting and/or Modulation and Coding Rate (MCR) for each stream. Note that antenna selection can be described by using a codebook containing transmit weight vectors that correspond to the columns of the identity matrix. Then a codebook weight and power weighting and/or MCR are fed back for each stream for the group of subcarriers. Another aspect of the invention involves a strategy whereby a subset of the transmit antennas are first chosen after which the codebook weight and power weighting and/or MCR are then fed back for each stream for the group of subcarriers. Another aspect of the invention involves selecting a subset of the transmit antennas and feeding back power weighting to be applied on each transmit antenna. In some embodiments, codebook feedback is used with antenna selection by using a codebook that contains zero entries in the transmit weight(s) that corresponds to the one or more antennas that are not selected.

For simplicity, the invention is presented from the point of view of providing a base station (BS) with the information necessary for setting the transmit weights in a closed-loop antenna array system (e.g., a plurality of spatially separated transmit antennas) when transmitting to a subscriber station (SS). It should be clear that the invention also applies to scenarios where the roles of a BS and SS are reversed from the roles described herein. For example, the invention can be applied to the scenario where the SS is to be provided with the necessary information to enable closed-loop transmission from an SS to a BS. Therefore, although the description will focus mainly on the case of the BS transmitting to a SS, the term "source communication unit" will refer to a communication unit (e.g., a BS, SS or other transceiver) that can perform closed loop transmission to a "target communication unit".

Also, some terms are used interchangeably in the specification: The terms, channel response, frequency selective channel profile, space-frequency channel response, are all referring to the channel response information needed by the base station in order to utilize closed-loop transmission techniques. The terms waveform and signal are also used interchangeably. A Subscriber device or Subscriber Station (SS) is sometimes referred to as a Mobile Station (MS) or simply a Mobile, and the invention applies equally to cases where the subscriber device is fixed or mobile (i.e., not fixed). A receiving device can be either a base station (BS), subscriber station (SS) or any combination thereof. Also, a transmitting device can be either a BS, SS, MS, or any combination thereof. Additionally, if the system has repeaters, relays or other similar devices, the receiving device or the transmitting device can be a repeater, relay, or other similar device. The repeater or relay can be considered equivalent to an SS if the BS is performing closed-loop transmission to the repeater/relay. The repeater or relay can be considered equivalent to a BS if the relay is performing closed-loop transmission to the SS. The term fast Fourier transform (FFT) and inverse fast Fourier transform (IFFT) refer to discrete Fourier transform (or similar transform) and inverse discrete Fourier transform (or similar transform) respectively.

DETAILED DESCRIPTION OF THE INVENTION

Turning now to the drawings, wherein like numerals designate like components, FIG. 1 is a block diagram of communication system 100 in which the present invention can operate. Communication system 100 comprises one or more cells 105 (only one shown) each having a base station (BS, or base station) 104 in communication with a plurality of subscriber stations (SSs) 101-103. If a transmission is to be performed on the downlink to SS 101, the BS 104 can be referred to as a source communication unit, and the SS 101 can be referred to as a target communication unit. If a transmission is to be performed on the uplink from SS 101 to the BS 104, SS 101 can be referred to as a source communication unit, and the BS 104 can be referred to as a target communication unit. In the preferred embodiment of the present invention, communication system 100 utilizes an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other cellular communication system protocols such as, but not limited to, TDMA, direct sequence CDMA, cyclic prefix single carrier systems, interleaved frequency division multiple access systems.

Figure 2:
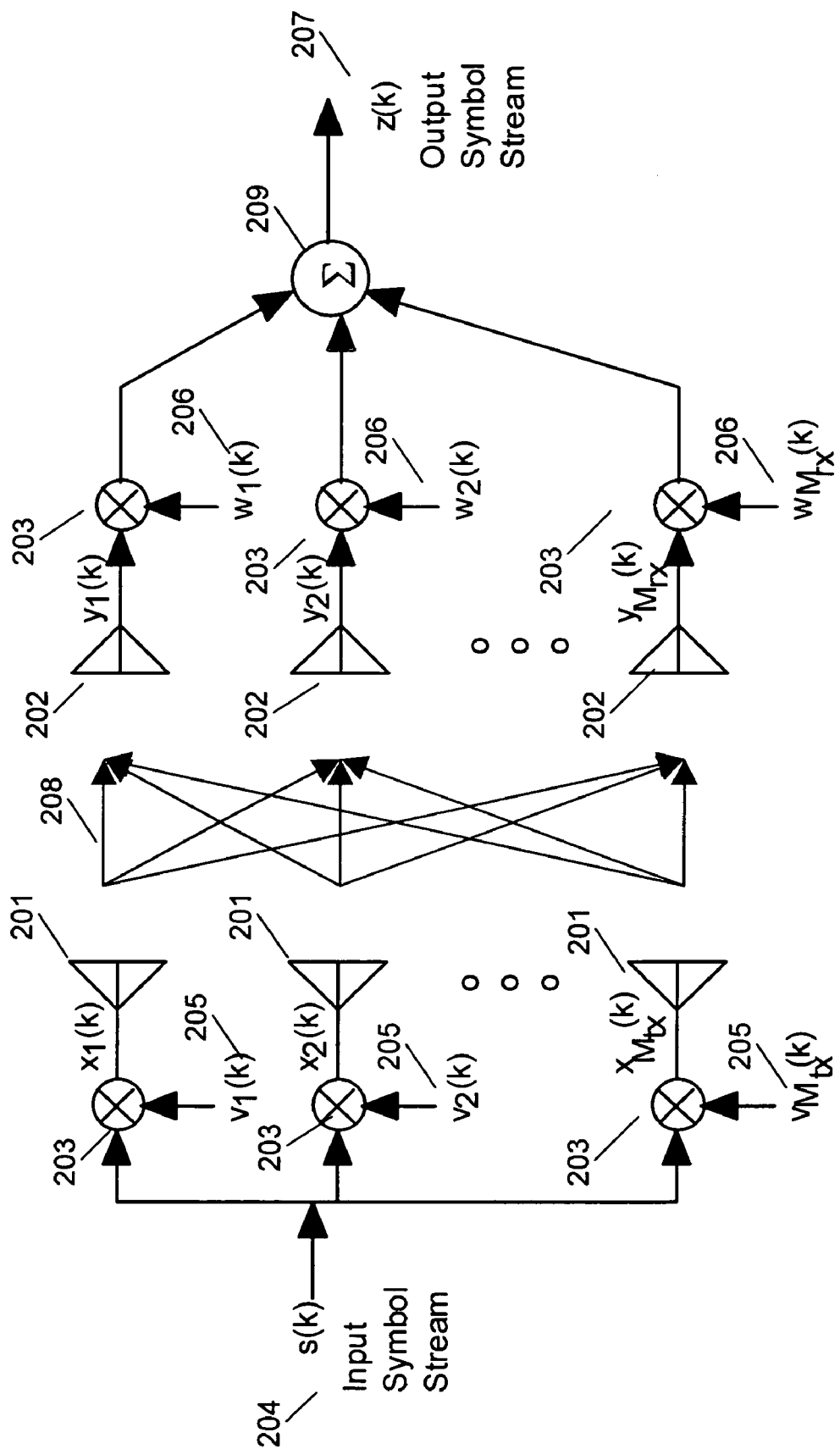
FIG. 2 is a block diagram of a closed-loop transmit antenna array communicating a single data stream to a receiving device having one or more receive antennas.

FIG. 2 is a block diagram of a closed-loop transmit antenna array as part of a source unit communicating a single data stream to a receiving device as part of a target communication unit having one or more receive antennas. Input stream 204 is multiplied by transmit weights 205 using multipliers 203 before being fed to the multiple transmit antennas 201. The signals transmitted from the multiple transmit antennas 201 propagate through a matrix channel 208 and are received by multiple receive antennas 202. The signals received on the multiple receive antennas 102 are multiplied by receive weights 206 using multipliers 203 and summed by a summation device 209 to produce the output symbol stream 207. The index "k" in FIG. 2 on the signals and on the transmit and receive weights denotes a time index, or a subcarrier (frequency) index (as in the case of OFDM for example), or a combination of both.

Figure 3:
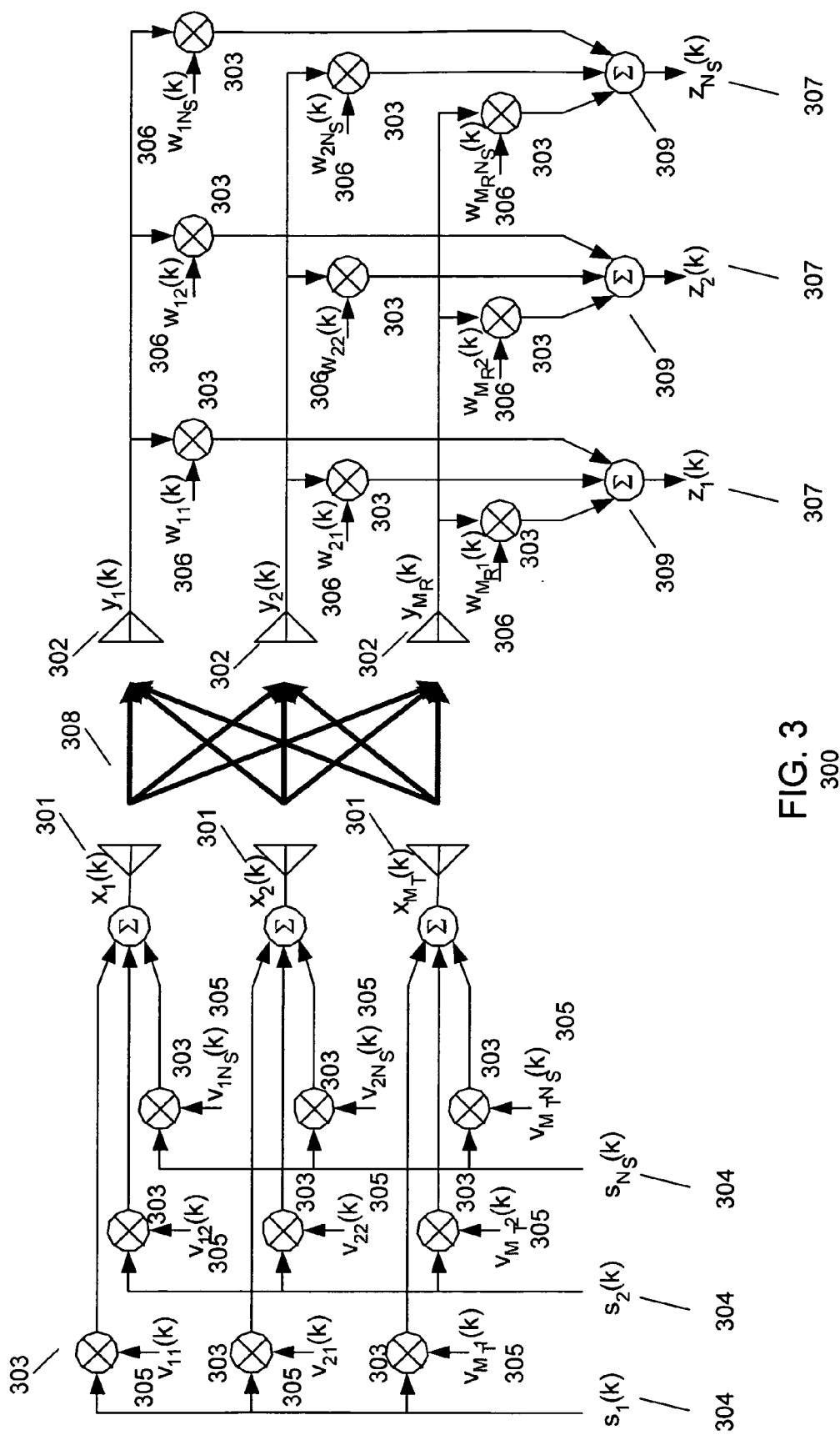
FIG. 3 is a block diagram of a closed-loop transmit antenna array communicating multiple data streams to a receiving device having one or more receive antennas.

FIG. 3 is a block diagram of a closed-loop transmit antenna array as part of a source unit communicating multiple data streams to a receiving device as part of a target communication unit having one or more receive antennas (e.g., a MIMO system). Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 can be multiplied by receive weights 306 using multipliers 303 and summed by a summation devices 309 to produce the multiple output symbol streams 307. Other embodiments of producing the output symbol streams 307 are possible such as maximum likelihood detection or successive cancellation that may or may not use the receive weights 306 and the multipliers 303.

Figure 4:
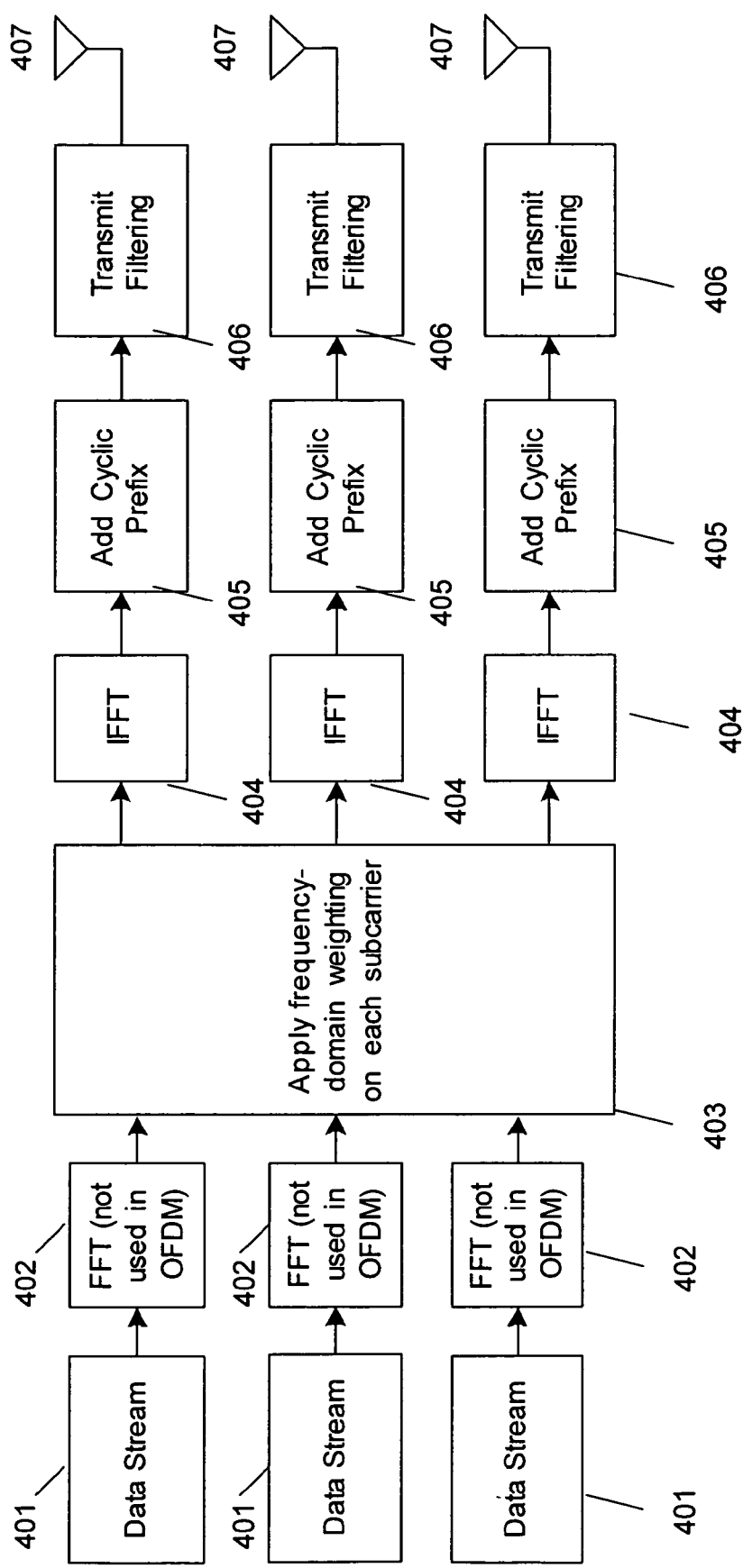
FIG. 4 is a block diagram of a frequency domain-oriented broadband transmission system employing a closed-loop transmit antenna array.

FIG. 4 is a block diagram of a frequency-domain oriented transmission system such as Orthogonal Frequency Division Multliplexing (OFDM) or cyclic prefix single carrier (CP-Single Carrier) in which the transmission techniques of FIGS. 2 and 3 are performed in the frequency domain prior to transmission. In a CP-Single Carrier system, one or more data streams 401 are first brought into the frequency domain with one or more FFTs 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIGS. 2 and 3 on each subcarrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

In mathematical terms, one aspect of the invention is a method and device for computing one or more transmit weight vectors that are used to multiply one or more data streams, as shown in the block diagrams of FIGS. 2, 3, and 4. The transmit weights can be calculated as follows. In limited feedback MIMO transmission, a codebook is maintained (or computed) at both the BS (transmitting device) and the SS (receiving device), and this codebook contains all possible transmit weight vectors that will be used by the transmit antenna array at the BS. The SS determines which transmit weight vector is the best weight vector in the codebook to use for data transmissions. The SS performs this determination based on BS transmissions received on the downlink. The SS also computes a power weighting that should be applied on each data stream so as to optimize the performance of successive cancellation receivers. Note that if the codebook matrix (a matrix whose columns contain the transmit weight vectors of the codebook) is equivalent to the identity matrix, then the codebook feedback strategy simply implements antenna selection. Alternative implementations of the invention perform the antenna selection not with codebook weight vectors having only ones and zeros, but with logical or physical selectors/switches.

Figure 5:
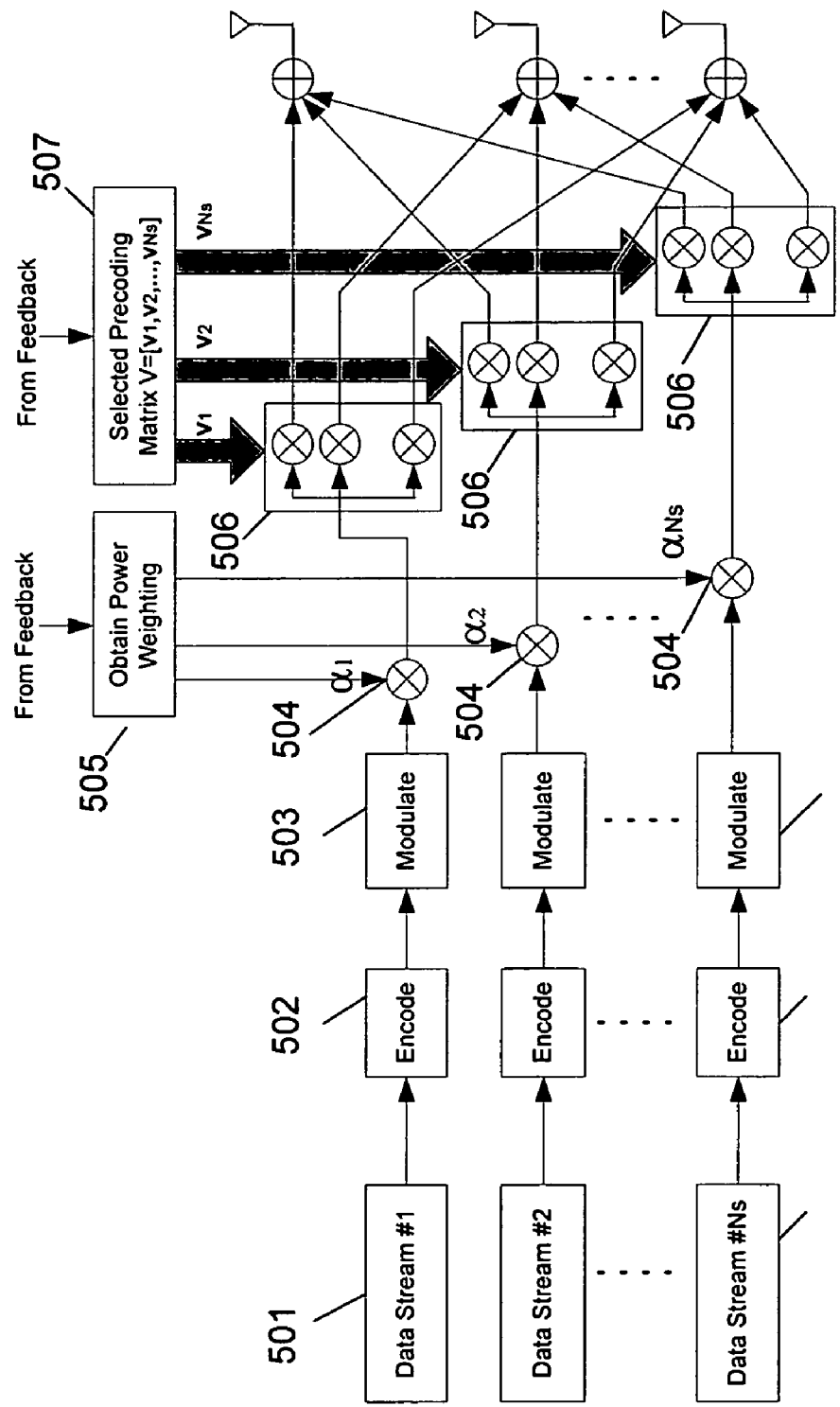
FIG. 5 is a block diagram of a transmitter using codebook selection and power weightings.

FIG. 5 is a block diagram of a source unit using codebook selection and power weightings. One or more data streams 501 are individually encoded (502) and modulated (503) to form the symbol streams to be transmitted, using either the frequency or time domain resources. Each stream is then power weighted in 504, according to the scalar weighting derived in block 505 from the feedback message.

Then, each stream is weighted in block 506 by a beamforming vector. The beamforming vector for each stream is obtained in block 507 by selecting from the codebook according to the feedback message that conveys the index of the selected transmit weight vector. The transmitted signal is then generated from all streams after power weighting and beamforming.

Figure 6:
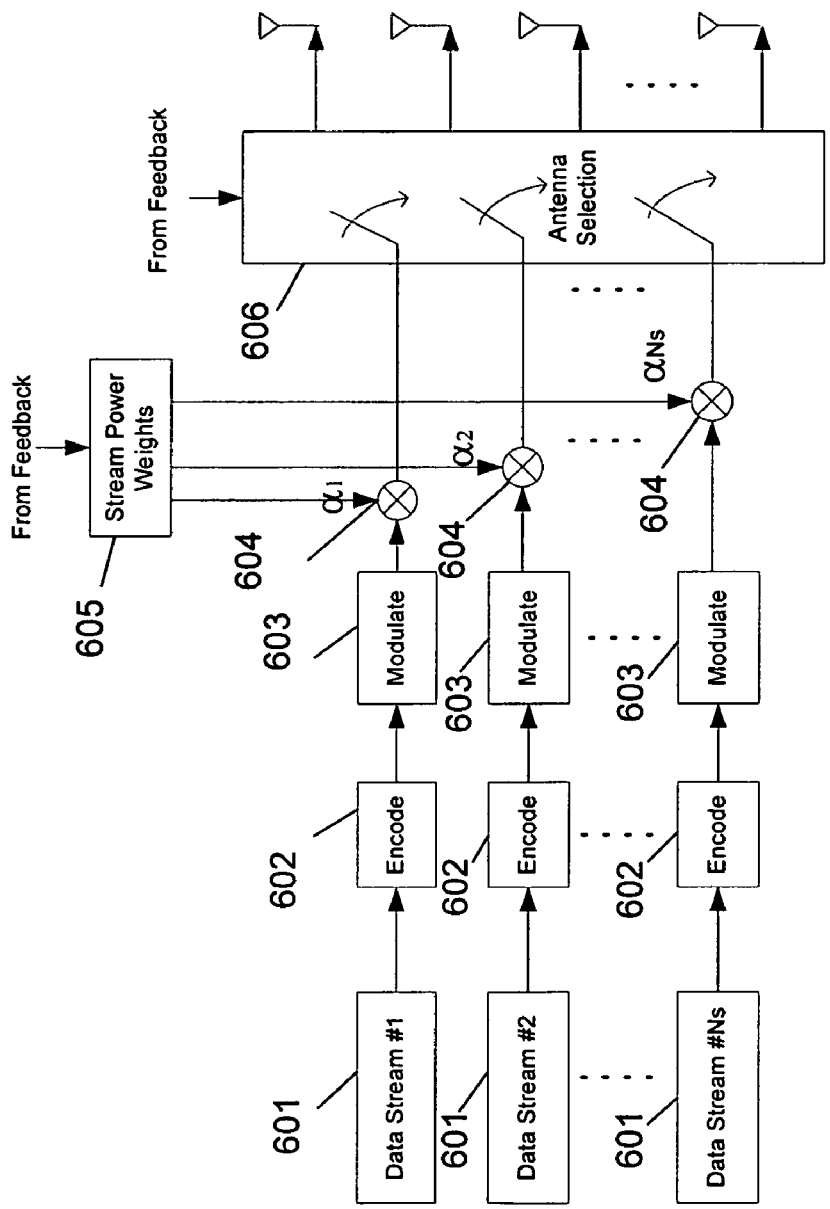
FIG. 6 is a block diagram of a transmitter using antenna selection and power weightings.

FIG. 6 is a block diagram of a source unit using antenna selection and power weightings. Note that this case is mathematically equivalent to using the codebook selection strategy of FIG. 5. with a codebook whose columns correspond to the columns of the identity matrix. One or more data streams 601 are individually encoded (602) and modulated (603) to form the symbol streams to be transmitted, using either the frequency or time domain resources. Each stream is then power weighted in 604, according to the scalar weighting derived in block 605 from the feedback message. Then, each stream is fed to an antenna through the antenna selection switch block 606. The antenna selection for each stream is according to the feedback message that conveys the index of the selected antenna for that stream. The antenna selection switch block 606 picks a subset of the total number of transmit antennas on which to transmit the data streams.

Figure 7:
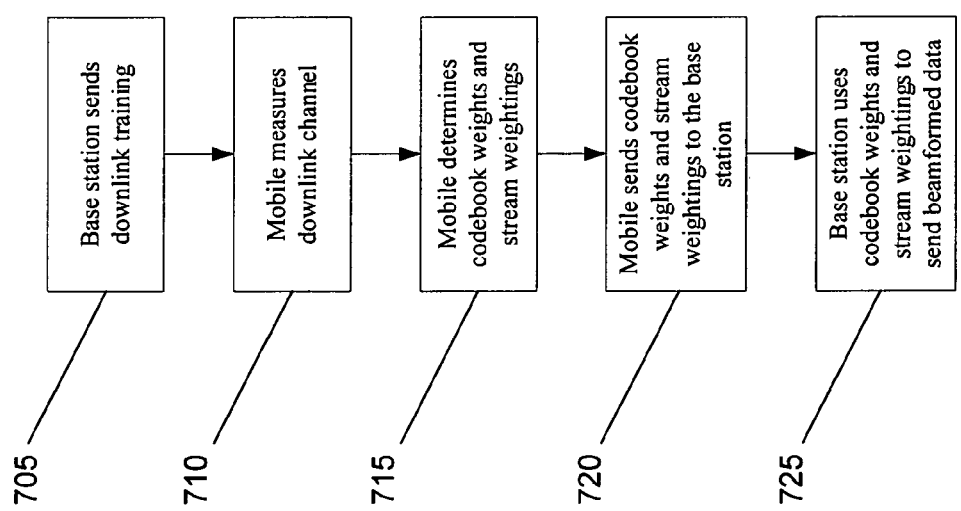
FIG. 7 is a flow chart of the entire feedback process.

FIG. 7 is a flowchart representation of the entire feedback method used by the invention. First, the BS transmits pilot data (i.e., symbols known at both the BS and MS) from each of its transmit antennas on a downlink 705. Next, the MS receives the downlink pilot data and measures the downlink channel estimates from each of the BS's antennas to each of its receive antennas 710 (although the pilots are preferably transmitted by the BS and used by the MS for said channel estimation, alternative channel estimation techniques, such as blind or decision-directed channel estimation methods may sometimes be used in the absence of pilots or as a supplement to the pilot-based channel estimation). Then the MS uses the downlink channel estimates to determine which of the codebook weight that the BS should use and the power weighting for each data stream 715. In one aspect of the invention, the selection of codebook weights and power weightings also includes a procedure to determine how many streams that the BS should transmit with. Then the MS encodes the codebook selections and power weightings in a feedback message and transmits the feedback to the BS 720. Finally, the BS receives the feedback and uses the information in the feedback message to beamform a downlink data transmission 725.

Figure 8:
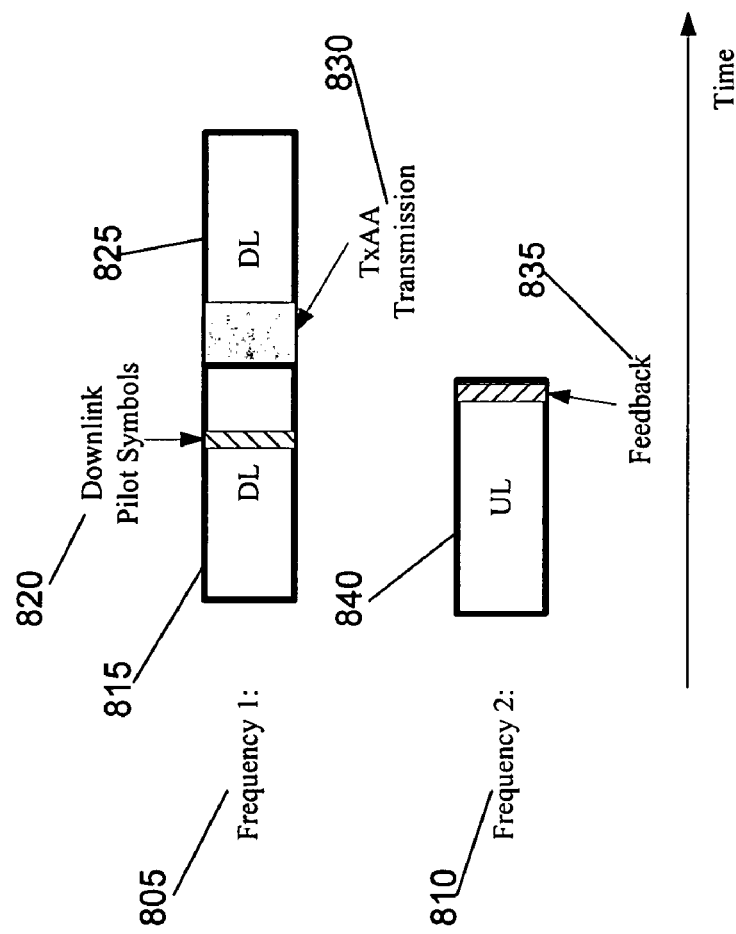
FIG. 8 is a timing diagram of the feedback process for FDD mode.

An example timing diagram of the feedback method is given in FIG. 8 for Frequency Division Duplexing (FDD) mode. For this FDD example the downlink is on carrier frequency 1 805 and the uplink is on carrier frequency 2 810. The BS sends pilot symbols from each of its transmit antennas 820 in a downlink frame 815. For example, in an OFDM system, the pilot symbols from different transmit antennas can be made orthogonal (to simplify the channel estimation at the MS) by time multiplexing, frequency multiplexing, code multiplexing, or some combination of these. An example of frequency multiplexing for the case of 4 transmit antennas is to transmit pilot symbols during a particular OFDM symbol period from antenna 1 on every $4^{th}$ subcarrier starting with the first subcarrier (subcarriers 1, 5, . . . ), from antenna 2 on every $4^{th}$ subcarrier starting with the second subcarrier (subcarriers 2, 6, . . . ), from antenna 3 on every $4^{th}$ subcarrier starting with the third subcarrier (3, 7, . . . ) and from antenna 4 on every $4^{th}$ subcarrier starting with the fourth subcarrier (4, 8, . . . ). Then the MS receives the pilot symbols and determines the codebook weight and power weighting for each data stream. The MS feeds back the codebook weights and power weightings in a feedback message 835 on an uplink frame 840. The base receives this feedback information and uses this information to perform closed-loop beamforming 830 on future downlink frame 825. Note that because the uplink and downlink transmissions occur simultaneously (unlike TDD mode), the overall delay from when the channels are measured 820 to when downlink beamforming is performed 830 can be small.

Figure 9:
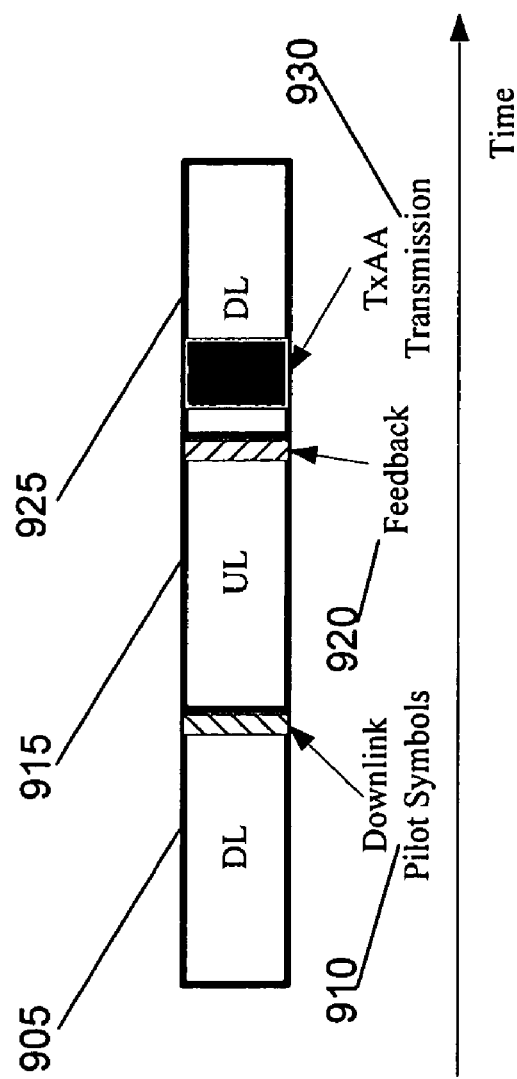
FIG. 9 is a timing diagram of the feedback process for TDD mode.

An example timing diagram of the feedback method is given in FIG. 9 for Time Division Duplexing (TDD) mode. The main difference between TDD and FDD modes is that in TDD the uplink and downlink can not be transmitted simultaneously and hence the uplink and downlinks must be separated in time. Because the uplinks and downlinks have to be separated in time, the feedback delay tends to be higher in TDD mode than FDD mode. However, the overall feedback operation is similar in both modes. The BS sends pilot symbols from each of its transmit antennas 910 in a downlink frame 905. Then the MS receives this data and determines the codebook weight and power weighting for each data stream. The MS feeds back the codebook weights and power weightings in a feedback message 920 on the next uplink frame 915. The base receives this feedback information and uses this information to perform closed-loop beamforming 930 on future downlink frame 925.

Figure 10:
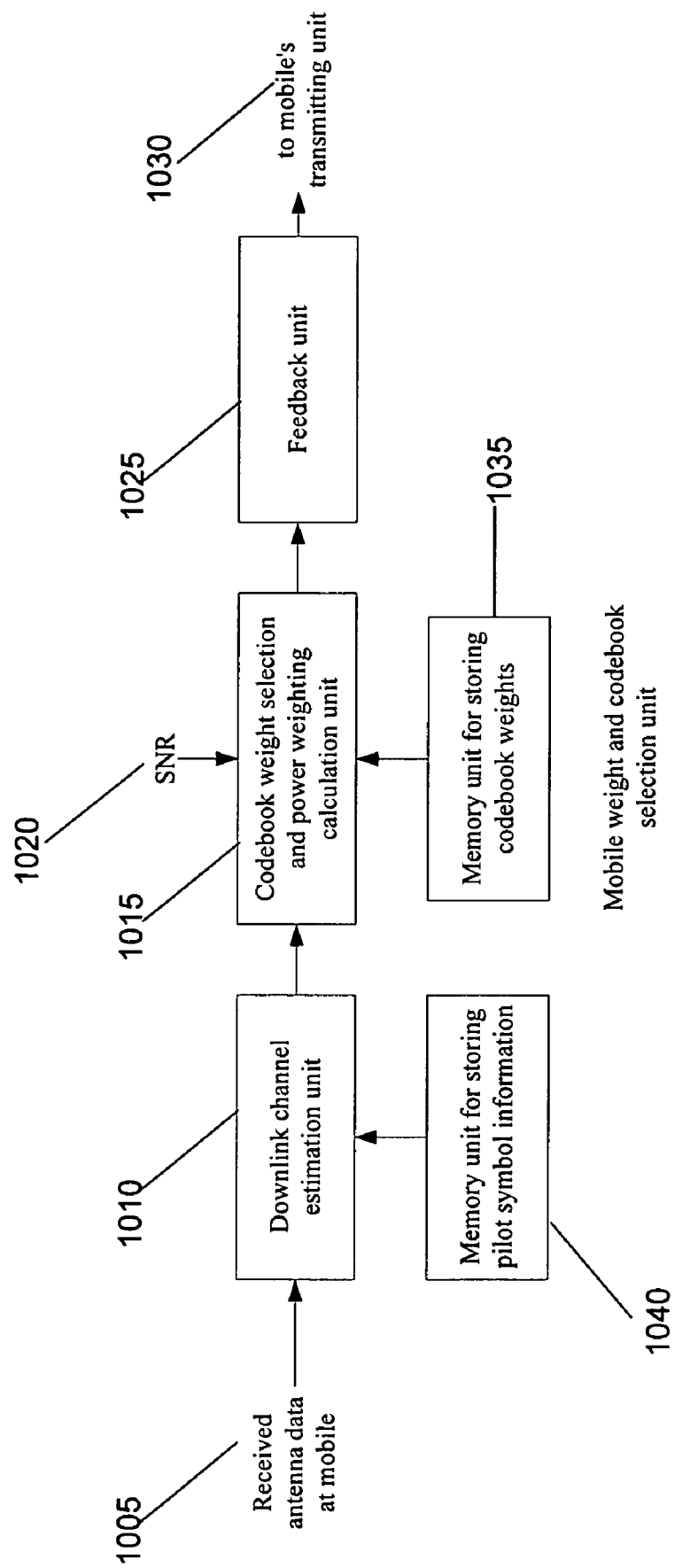
FIG. 10 is a block diagram of a mobile's weight and codebook selection unit.

FIG. 10 is a block diagram of the MS weight and codebook selection unit 1000. The downlink channel estimation unit 1010 is provided with received antenna data 1005 corresponding to the transmitted pilot data from the BS along with the pilot symbols for each BS transmit antenna from the memory unit for storing pilot symbol information 1040. The downlink channel estimation 1010 unit uses the provided information to determine channel estimates, which it provides to the codebook weight selection and power weighting calculation unit 1015. The codebook weight selection and power weighting calculation unit 1015 is also provided with an estimate of the Signal to Noise Ratio (SNR) 1020 as well as the codebook weight choices from the memory unit for storing codebook weights 1035. The codebook weight selection and power weighting calculation unit 1015 uses the provided information to determine which codebook weight to use on each stream along with their corresponding power weightings. The codebook weight selection and power weighting calculation unit 1015 may also determine the number of data streams along with the codebook weight selection and power weighting calculation. The codebook weight selection and power weighting calculation unit 1015 then provides the codebook weights and power weightings to the feedback unit 1025 which encodes this information for transmission to the base. The feedback unit 1025 provides the encoded feedback information to the MS's transmitting unit 1030 which transmits the information to the BS.

Figure 11:
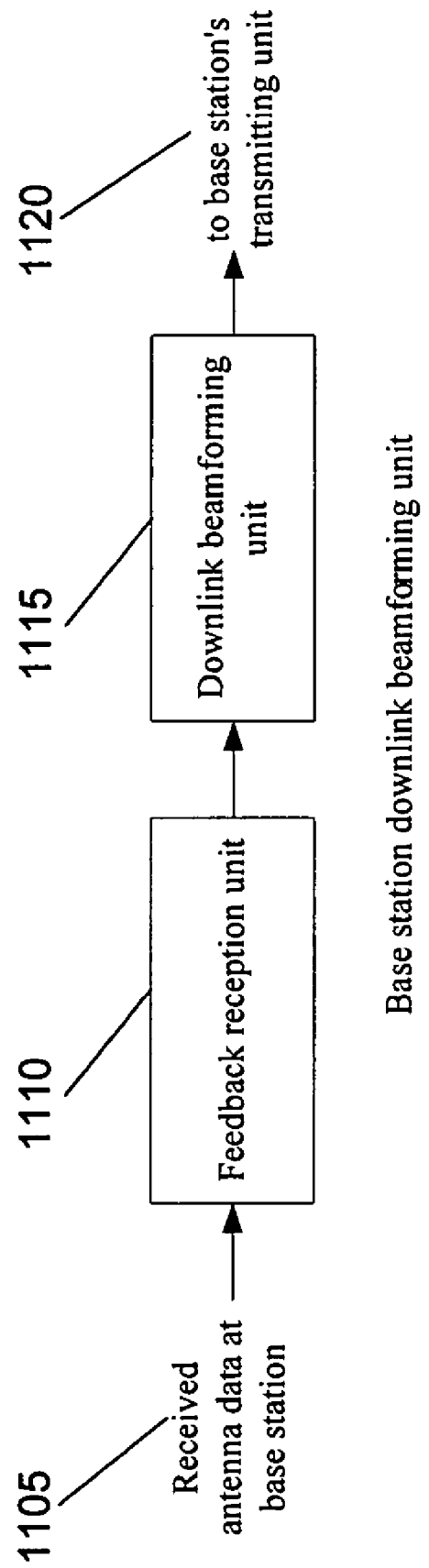
FIG. 11 is a block diagram of a base station's downlink beamforming unit.

FIG. 11 is a block diagram of the BS's downlink beamforming unit 1100. The feedback reception unit 1110 is provided with the received antenna data 1105 corresponding to the feedback portion of an uplink. The feedback reception unit 1110 uses the provided received feedback data to determine the codebook weight selection and power weightings sent by the MS in its feedback message. The feedback reception unit 1110 then provides the codebook weight selection and power weightings to the downlink beamforming unit 1115 which uses this information to produce beamformed downlink data to the MS. The beamformed downlink data is sent to the BS's transmitting unit 1120 for transmission on a downlink data frame.

For the feedback method described in the previous paragraphs, the channel bandwidth may be divided into different granularities and the feedback and transmit weighting can be performed accordingly. For example, a single set of codebook weights and power weights can be fed back and used for the entire bandwidth allocated to a particular MIMO transmission to a MS (e.g., all OFDM subcarriers that will be used for the transmission). Alternatively, a frequency selective approach can be used, where more than one set is fed back, with each set corresponding to a different set of subcarriers. This latter approach increases the feedback overhead but may provide improved performance in some frequency selective channel conditions. In another example, a single set of codebook weights and power weights can be determined based on the channel estimates over a bandwidth that is larger than the bandwidth that will be used for the subsequent MIMO transmission (e.g., based on the entire channel bandwidth even though the subsequent MIMO transmission to the MS will only occupy a small subset of the total subcarriers). This latter approach provides more averaging and may be beneficial when the channel is expected to change significantly between the time when the pilots are transmitted and when the MIMO transmission will occur.

A detailed description of the proposed feedback method is now given. Let there be $M_b$ transmit antennas at the base and $M_m$ receive antennas at the mobile: Assuming an OFDM downlink with K usable subcarriers, the received $M_m \times 1$ signal at the mobile on subcarrier k ($0 \leq k \leq K-1$) and symbol time b is given as (note this is the downlink signal used by the mobile to measure the channel response to each base antenna):

$$Y(k,b) = H(k,b)x(k,b) + N(k,b) \quad (1)$$

where $H(k,b)$ is the $M_m \times M_b$ frequency-domain channel matrix on subcarrier k and symbol time b, $x(k,b)$ is the $M_b \times 1$ training vector, and $N(k,b)$ is additive noise with covariance matrix $\sigma_n^2 I_{M_m}$ (where $I_n$ is an n×n identity matrix). Time index b indicates the time where the downlink channel is measured for use in determining the power weights and codebook weights to feed back (multiple time indices can be used if multiple OFDM symbols are needed to sound all $M_b$ transmit antennas).

Codebook Index Selection

It will be assumed that there are $N_c$ codebook weights given in the $M_b \times N_c$ matrix V. Particular examples of V are the Grassmannian weights from the prior art or the antenna selection weights (i.e., $N_c = M_b$ and $V = I_{M_b}$). The $M_m \times N_c$ composite frequency-domain channel for all codebook weights (i.e., the RF channel matrix times all codebook weights) is given as:

$$G(k,b) = H(k,b)V \quad (2)$$

where the mobile uses its estimate of $H(k,b)$ measured on the downlink.

Now the mobile just needs to determine which of the $N_s$ (where $N_s$ is the number of MIMO streams) columns of V to use as the codebook weights for each stream. Various criteria can be used to determine the weights such as choosing the $N_s$ columns of $G(k,b)$ (averaged across frequency) that have the highest power or choosing the $N_s$ columns of $G(k,b)$ that maximize the average capacity. For the maximum power selection technique, the $N_s$ columns (labeled $v_1$ through $v_{N_s}$) are chosen as the v's corresponding to the $N_s$ largest values of:

$$\sum_{k \in \Omega} g_v^H(k,b) g_v(k,b) \quad (3)$$

where $\Omega$ is the set of subcarriers for the single set of codebook weights and $g_v(k,b)$ is the $v^{th}$ column of $G(k,b)$. As described earlier, different frequency granularities may be used in different scenarios, and this is reflected in the choice of $\Omega$.

The maximum capacity method is given as the $N_s$ columns (labeled $v_1$ through $v_{N_s}$) chosen as the v's corresponding to the $N_s$ largest values of:

$$\sum_{k \in \Omega} \log_2 \left( 1 + \frac{1}{N_s \sigma_n^2} \det \left( \begin{bmatrix} g_{v_1}^H(k,b) \\ \vdots \\ g_{v_{N_s}}^H(k,b) \end{bmatrix} \begin{bmatrix} g_{v_1}(k,b) & \cdots & g_{v_{N_s}}(k,b) \end{bmatrix} \right) \right) \quad (4)$$

where the search over is performed over all $$\binom{N_c}{N_s}$$

possible combinations of $v_1$ through $v_{N_s}$.

Note that the advantage of the maximum power technique for choosing the columns of V is that it has lower computational complexity than the capacity method which requires a search over all possible combinations of streams.

Stream Power Calculation

The power levels on each stream can be calculated in a manner that is summarized in this section. It will be assumed that the stream order (1 through $N_s$) is chosen from best through worst (e.g., the largest average power to the $N_s^{th}$ largest power using the power maximum technique from the last section). Let the $M_m \times N_s$ composite channel for just the $N_s$ streams chosen (labeled $v_1$ through $v_{N_s}$) be given as:

$$C(k,d) = [c_1(k,d), \ldots, c_{N_s}(k,d)] = H(k,d)[V_{v_1}, \ldots, V_{v_{N_s}}] \quad (5)$$

where d is the time index of the beamformed downlink (i.e., the total delay from when the channel was measured to when it is used in number of OFDM symbols is d-b).

The goal is for the mobile to feed back the codebook weights calculated from the last section and determine power weightings $\alpha_1$ through $\alpha_{N_s}$ so that the received $M_m \times 1$ beamformed downlink signal is given as:

$$Y(k,d) = \sum_{u=1}^{N_s} \alpha_u C_u(k,d) X_u(k,d) + N(k,d) \quad (6)$$

where $X_u(k,d)$ is the symbols value for stream u on subcarrier k and OFDM symbol d.

To keep the average transmit power fixed, the sum of the power on each stream is made to be equal to one:

$$\sum_{u=1}^{N_s} \alpha_u^2 = 1 \quad (7)$$

It is assumed that the streams are cancelled in order so the following successive cancellation algorithm can be applied:
 1. Start with l=1.
 2. Determine the frequency-domain symbol estimate for stream l for $0 \leq k \leq K-1$ from:

$$\hat{X}_l(k,d) = w_l^H(k,d) Y(k,d) \quad (8)$$

where $$w_l(k,d) = \alpha_l(H(k,d)H^H(k,d) + \sigma_n^2 I_M)^{-1} c_l(k,d) \quad (9)$$

with $M_m \times (N_s+1-l) H(k,d) = [\alpha_l c_l(k,d), \ldots, \alpha_{N_s} c_{N_s}(k,d)]$ (10)

3. Determine the metric needed for the coding type (e.g., Log Likelihood Ratios (LLRs) for turbo or LDPC coding). Note that for single carrier or spread-OFDM that a despreading operation may be needed before determining the metric (e.g., an IFFT for single carrier or a inverse Hadamard transform for spread OFDM).
4. Decode the received frame to get bit estimates for stream l.
5. Re-encode the bit estimates for data stream l.
6. Map the coded bit estimates back to frequency-domain symbols values, $X_l(k,b)$. Note that a spreading operation is needed for single carrier or spread OFDM.
7. If $l=N_s$ then stop, otherwise go to Step 8.
8. Cancel stream l from Y(k,d) for 023 $k \leq K-1$:

$$Y(k,d) = Y(k,d) - \alpha_l c_l(k,d) X_l(k,d) \quad (11)$$

9. l=l+1, go to Step 2.

The goal is to find the power weightings, $\alpha_1$ through $\alpha_{N_s}$, that equalize the expected MSE (averaged across frequency) after the above successive cancellation reception algorithm is applied to a model of the received signal. Using the orthogonality principal the MSE on subcarrier k and time b for stream u can be shown to be:

$$MSE_u(k,b) = 1 - \alpha_u w_u^H(k,b) c_u(k,b) \quad (12)$$

where $w_u(k,b)$ is given in (9). Note that the composite channel at time b is used to calculate the weights because the mobile only has knowledge of the downlink channel at time b.

In order to get a form of the MSE that lends itself to a relatively simple iterative solution for the power weightings, the MSE formula in (12) is converted to the following form using Woodbury's identity to remove the dependence on stream u's channel from the inverse in (9):

$$MSE_u(k,b) = \frac{1}{1 + \alpha_u^2 c_u^H(k,b) Q_u^{-1}(k,b) c_u(k,b)} \quad (13)$$

where $M_m \times M_m$ $Q_u(k,b)$ is:

$$Q_u(k,b) = \sum_{l=u+1}^{N_s} \alpha_l^2 c_l^H(k,b) c_l(k,b) + \sigma_n^2 I_{M_m} \quad (14)$$

The advantage of the form of the MSE in (13) is that the power weight for stream u only appears in once in the denominator (i.e., $Q_u(k,b)$ does not contain $\alpha_u$) which makes an iterative solution easier to implement. Assuming the MIMO streams are encoded across frequency in OFDM, the power weightings should be chosen to make the MSE averaged across frequency be the same for each stream (in single carrier and spread OFDM the power weightings should always be chosen in this fashion). Thus a formula is needed for the average MSE for stream u at time b, which is given as ($\Omega$ is the set of subcarriers where the weights are to be found and $|\Omega|$ are the number of subcarriers in $\Omega$):

$$MSE_u(b) = \frac{1}{|\Omega|} \sum_{k \in \Omega} \frac{1}{1 + \alpha_u^2 c_u^H(k,b) Q_u^{-1}(k,b) c_u(k,b)} \quad (15)$$

An iterative solution for the power weights can now be given as:
1. Start with $\alpha_u = 1/\sqrt{N_s}$ for $u=1, \ldots, N_s$.
2. Determine $MSE_u(b)$ for $u=1, \ldots, N_s$ using (15).
3. Stop iterating if all MSEs are approximately equal, otherwise go to Step 4.
4. Increase the power for the stream with the highest MSE by a small amount.
5. Decrease the power of all other streams equally so that the unit power constraint in (7) is satisfied.
6. Go to step 2.

An alternate iterative method for determining the power weights uses an approximation that is reasonable if the noise power is less than one. The approximation assumes that the second term in the denominator of (15) dominates and thus the one can be ignored resulting in an expression for the MSE for stream u given as:

$$MSE_u(b) = \frac{1}{|\Omega| \alpha_u^2} \sum_{k \in \Omega} \frac{1}{c_u^H(k,b) Q_u^{-1}(k,b) c_u(k,b)} \quad (16)$$

Note that the advantage of (16) is that an expression for $\alpha_{N_s-1}$ can be found in terms of $\alpha_{N_s}$, then an expression for $\alpha_{N_s-2}$ can be found in terms of $\alpha_{N_s-1}$ and $\alpha_{N_s}$, and so on. Therefore an iterative method can be developed that iterates just over $\alpha_{N_s}$ by using the following formula:

$$\alpha_u^2 = \frac{1}{|\Omega| MSE_{N_s}(b)} \sum_{k \in \Omega} \frac{1}{c_u^H(k,b) Q_u^{-1}(k,b) c_u(k,b)} \quad (17)$$

The iterative solution is to search over $\alpha_{N_s}$ where the MSE for each stream is made equal at each iteration. The iterations continue until the sum of the powers of all streams is close to one. The steps for this iterative search for the power weightings are:
1. Start with $$\alpha_{N_s}^2 = \frac{1}{2N_s} \text{ and } s = \frac{1}{4N_s}$$

and choose stopping factor, $\epsilon$ (e.g., $\epsilon=0.0001$).
2. Determine the MSE for stream $N_s$ from (16).
3. For $u=1, \ldots, N_s-1$, find $\alpha_u^2$ from (17).
4

If $\sum_{u=1}^{N_s} \alpha_u^2 < N_s$ then $\alpha_{N_s}^2 = \alpha_{N_s}^2 + s$ else $\alpha_{N_s}^2 = \alpha_{N_s}^2 - s$.

5. s=s/2.
6. If $s < \epsilon$ then go to Step 7, otherwise go to Step 2.

7. Make the power weightings have unit power by enforcing (7). This can be done by first computing $$G = \sum_{u=1}^{N_s} \alpha_u^2.$$

The final values for $\alpha_u^2$ are then: $\alpha_u^2 = 1/G\alpha_u^2$.

Figure 12:
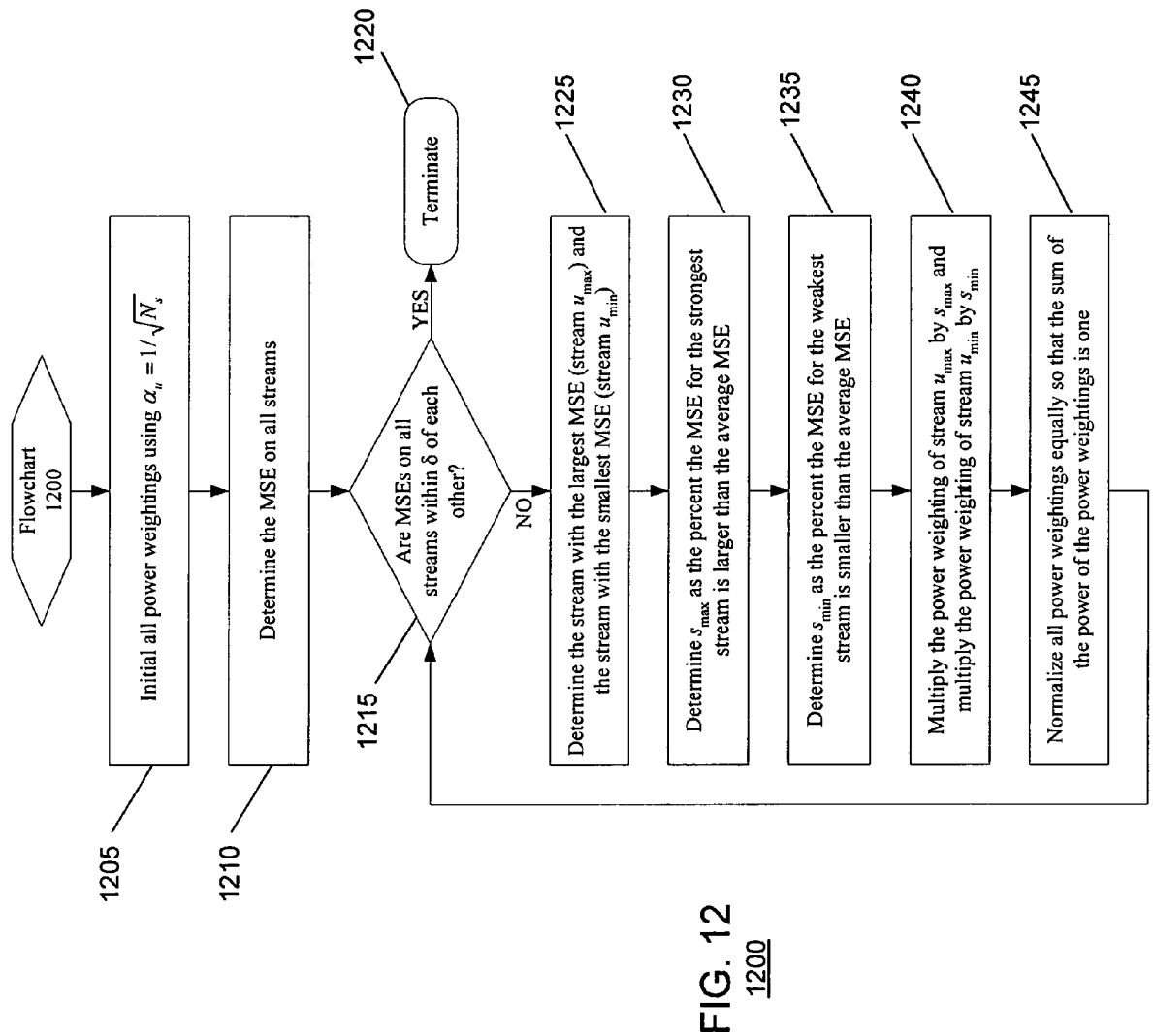
FIG. 12 is a flowchart of the power weighting calculation in the preferred embodiment.

A final method of calculating the power weightings is given in the flowchart 1200 of FIG. 12. The MS initializes all power weightings to be the same 1205: $\alpha_u = 1/\sqrt{N_s}$ for $u=1, \ldots, N_s$. Then the MS determines the MSE on each stream using either (15) or (16). In step 1215, if all of the MSEs are within some $\delta$ of each other (e.g., $\delta$=0.001), then the flowchart terminates 1220. In step 1215 if all of the MSEs are not with some $\delta$ of each other, then the flowchart proceeds to step 1225. In step 1225 the MS determines which stream, designated stream $u_{max}$, has the largest MSE and which stream, designated stream umin, has the smallest MSE. Then the MS proceeds to step 1230 where $s_{max}$ is determined as:

$$s_{max} = \frac{MSE_{u_{max}}(b)}{\frac{1}{N_s}\sum_{l=1}^{N_s} MSE_l(b)} \quad (18)$$

Proceeding next to step 1235, the MS determines $s_{min}$ as:

$$s_{min} = \frac{MSE_{u_{min}}(b)}{\frac{1}{N_s}\sum_{l=1}^{N_s} MSE_l(b)} \quad (19)$$

Then in the next step, step 1240, the MS alters the power weightings for streams $u_{min}$ and $u_{max}$ as follows:

$$\alpha_{u_{min}}^2 = s_{min}\alpha_{u_{min}}^2 \quad (20)$$

$$\alpha_{u_{max}}^2 = s_{max}\alpha_{u_{max}}^2 \quad (21)$$

Then in step 1245, the MS normalizes the power weightings by first computing $$G = \sum_{u=1}^{N_s} \alpha_u^2$$

and then changing the values of all power weighting using $\alpha_u^2 1/G\alpha_u^2$ $u=1, \ldots, N_s$. The flowchart then proceeds back to step 1215.

Note that all the methods of calculating the power weights for each stream requires a number of calculations in real time because the measured downlink channel is used to determine $c_i(k,b)$ used in the searches. An option for limiting the computations required is for the mobile to pre-calculate the weights (e.g., using a statistical model for the channel) and then use a table lookup to determine the power weights based on a long term statistic like SNR.

Although the above procedure of computing the power weightings is particularly developed for successive cancellation receiver as a preferred embodiment, another embodiment is the application of power weighting concept to other types of receivers such as linear MMSE or ZF receivers. Power weighting may still improve the performance of those receivers. For those receiver types, the computation procedure of the power weighting may be different from what was described above. For example, a closed-from solution of the power weighting may exist for MMSE receivers.

Signaling of the Feedback

Various methods are possible for feeding back the codebook weights and their respective powers and two such methods are described in this section. The first method is designed for the case where the number of possible codebook weights, $N_c$, is not much greater than the number of streams, $N_s$. Let $v_1$ through $v_{N_s}$ denote the codebook weight choices for stream 1 through stream $N_s$. This feedback method uses the following steps:

1. Quantize the power weightings for streams two through $N_s$, $\alpha_u^2$ for $u=2, \ldots, N_s$, to $2^B-1$ levels between $\frac{1}{2}^B$ (bit values [0,0, ... 0,1]) and $0.5(1-\frac{1}{2}^B)$ (bit values [1, 1, ..., 1,0]) where B bits are used to signal the power level. (Note that a data carrying stream is not allowed to have zero power.) These are the feedback values for codebooks $v_2$ through $v_{N_s}$.
2. Set the power weighting feedback for stream 1 (i.e., codebook $v_1$) to [1,1, ..., 1].
3. Set the feedback for all other codebook weights to [0, 0, ..., 0], i.e., $v=1, \ldots, N_c$ and $v \neq v_u$ (for $u=1 \ldots, N_s$).
4. Transmit the appropriate bit values for all $N_c$ codebooks to the base.

Note that the base only knows the transmit power of streams two through $N_s$ (i.e., [1,1, ..., 1] indicates the strongest stream and not a power level). However, the base can determine the power level for stream one using (7). Note also that the power for streams two through $N_s$ only need to be quantized to values between zero and one half to cover expected channel conditions (i.e., the probability of ever needing a power level greater than one half is very small).

The second feedback method is for when the number of codebook weights is much greater than the number of streams. In this case it is better to signal the codebook number (i.e., $v_1$ through $v_{N_s}$) along with the stream power quantized in a manner similar to the previous method.

The feedback method of the invention can be expanded to include the following capabilities:

1. Jointly calculating optimal codebook plus power weightings instead of separately calculating both as described above.
2. Choosing MCR instead of power weighting on each stream (equal power streams). By choosing a different MCR level on each codebook weight the performance of successive cancellation can be significantly improved.
3. Choosing the MCR on each stream in addition to power weightings.
4. Calculating the power weights and determining the codebook using more subcarriers than in the set $\Omega$ for improving performance in mobility. Basically this idea provides more averaging to determine the solution and thus is better matched to the long-term statistics of the channel.

In summary, the invention can be summarized as follows: The invention comprises a method for communicating a plurality of data streams between a transmitting device with multiple transmit antennas and a receiving device. The method comprises determining a list consisting of a subset of the multiple transmit antennas on which the transmitting device will transmit data, determining a set of power weightings, providing the set of power weightings and the list of the subset of the multiple transmit antennas to the transmitting device, weighting a plurality of data streams by the power weightings, and transmitting the power weighted data streams on the subset of the multiple transmit antennas to the receiving device. Another aspect of the invention comprises maintaining a codebook consisting of a plurality of transmit weight vectors at both the transmitting device and the receiving device. The method also comprises determining a list consisting of a subset of the plurality of transmit weight vectors which to use for transmitting the multiple data streams, determining a set of power weightings to be use for each data stream, providing the set of power weightings and the list of the subset of the plurality of transmit weight vectors to the transmitting device, and weighting the data streams by the power weightings and beamforming the data streams with the subset of the plurality of transmit weight vectors.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. It is intended that such modifications, alterations, and combinations come within the scope of the following claims.

We claim:

1. A method for communicating a plurality of data streams between a transmitting device with multiple transmit antennas and a receiving device, the method comprising the steps of:
   receiving pilot data from each of the transmit antennas at the transmitting device;
   selecting a plurality of vectors from a codebook, wherein the vectors are selected based on the received pilot data, and wherein a vector is used to weight the transmit antennas for one data stream;
   determining a set of stream power weightings to be used for weighting each data stream, wherein the stream power weightings are based on selected codebook vectors used to weight the transmit antennas and additionally based on the received pilot data; and
   providing the set of stream power weightings and the codebook vectors to the transmitting device;
   wherein the step of determining the stream power weightings comprises the steps of:
   determining a composite channel for each data stream based on the codebook vectors and the received pilot data;
   determining a set of power weightings to be used for each data stream that give a substantially same mean square error on each data stream where the mean square error is a function of the composite channel.

2. The method of claim 1 wherein at least one of the codebook vectors is provided to the transmitting device by the receiving device providing an index of the codebook vector.

3. The method of claim 1 wherein the stream power weightings are provided to the transmitting device for only ($N_s-1$) data streams, where $N_s$ is the total number of data streams.

4. The method of claim 1 wherein the set of stream power weightings is chosen so as to cause each data stream to have substantially a same mean square error at an output of a successive cancellation receiver used by the receiving device.

5. The method of claim 1 wherein the set of stream power weightings is chosen so as to cause each data stream to have substantially a same mean square error at an output of a linear array combiner used by the receiving device.

6. The method of claim 1 wherein the set of stream power weightings and the codebook vectors are provided to the transmitting device by means of a feedback channel.

7. The method of claim 1 wherein the step of determining a composite channel estimate comprises the steps of:
   determining a channel estimate for each transmit antenna from the received pilot data; and
   determining a composite channel for each data stream as a function of the codebook vectors and the channel estimates for each transmit antenna.

8. The method of claim 1 wherein the step of determining the set of stream power weightings to be used for each data stream comprises the steps of:
   determining a noise covariance matrix; and
   determining a set of stream power weightings to be used for each data stream based on the codebook vectors, the received pilot data, and the noise covariance matrix.

9. An apparatus for communicating a plurality of data streams between a transmitting device with multiple transmit antennas and a receiving device, the apparatus comprising:
   a receiver receiving pilot data from each of the transmit antennas at the transmitting device;
   a codebook weight selection and power weighting calculation unit determining a plurality of vectors from a codebook which to use to weight the transmit antennas wherein the vectors are selected based on the received pilot data, and also determining a set of stream power weightings to be used for each data stream based on the selected codebook vectors used to weight the transmit antennas and also based on the received pilot data; and
   a feedback unit providing the set of stream power weightings and the codebook vectors to the transmitting device, causing the transmitting device to weight the data streams by the power weightings and beamform the power weighted data streams with its corresponding transmit vector;
   wherein the codebook weight selection and power weighting calculation unit also determines a composite channel for each data stream based on the codebook vectors and the received pilot data and then determines a set of stream power weightings to be used for each data stream that give a substantially same mean square error on each data stream where the mean square error is a function of the composite channel.

10. The apparatus of claim 9 wherein the feedback unit provides at least one of the codebook vectors to the transmitting device by providing an index of the codebook vector.

11. The apparatus of claim 9 wherein the feedback unit provides to the transmitting device stream power weightings for only ($N_s-1$) data streams, where $N_s$ is the total number of data streams.

12. The apparatus of claim 9 wherein the set of stream power weightings is chosen so as to cause each data stream to have substantially a same mean square error at an output of a successive cancellation receiver used by the receiving device.

13. The apparatus of claim 9 wherein the set of stream power weightings is chosen so as to cause each data stream to have substantially a same mean square error at an output of a linear array combiner used by the receiving device.

14. The apparatus of claim 9 wherein the set of stream power weightings and the plurality of transmit weight vectors are provided to the transmitting device by means of a feedback channel.

15. The apparatus of claim 9 wherein the codebook weight selection and power weighting calculation unit also determines a channel estimate for each transmit antenna from the received pilot data and then determines a composite channel for each data stream as a function of the codebook vectors and the channel estimates for each transmit antenna.

16. The apparatus of claim 9 wherein the codebook weight selection and power weighting calculation unit also is provided a signal to noise ratio estimate and then determines a set of stream power weightings to be used for each data stream based on the codebook vectors, the received pilot data, and the signal to noise ratio.

* * * * *